(12) United States Patent
Bae et al.

(10) Patent No.: US 7,445,153 B2
(45) Date of Patent: Nov. 4, 2008

(54) METHOD FOR PREVENTING SECURITY BARCODE FROM BEING REPRODUCED IN MOBILE TERMINAL AND MOBILE TERMINAL IMPLEMENTING THE SAME

(75) Inventors: Mun-Ho Bae, Gumi-si (KR); Moon-Heui Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 11/395,252

(22) Filed: Apr. 3, 2006

(65) Prior Publication Data

US 2007/0001858 A1 Jan. 4, 2007

(30) Foreign Application Priority Data

Jun. 30, 2005 (KR) .................. 10-2005-0058042

(51) Int. Cl.
*G06K 19/06* (2006.01)
*H04M 1/66* (2006.01)
(52) U.S. Cl. .................. 235/462.01; 235/494; 235/375; 235/377; 455/410; 455/411; 455/456.1; 455/456.4; 340/5.32; 340/815.4; 340/5.3; 348/207.99
(58) Field of Classification Search .................. 235/494; 726/26, 33; 348/207.99, 207.1, 207.11, 211.1, 348/211.2, 211.3, 21.99, 211.8; 455/456.1–456.5, 455/410–411
See application file for complete search history.

(56) References Cited

U.S. PATENT DOCUMENTS

| 5,659,167 | A | | 8/1997 | Wang | |
|---|---|---|---|---|---|
| 5,939,699 | A | * | 8/1999 | Perttunen et al. | 235/462.01 |
| 7,203,158 | B2 | * | 4/2007 | Oshima et al. | 370/208 |
| 2002/0090953 | A1 | * | 7/2002 | Aburai et al. | 455/456 |
| 2003/0008662 | A1 | * | 1/2003 | Stern et al. | 455/456 |
| 2004/0046871 | A1 | | 3/2004 | Ichikawa | |
| 2005/0007456 | A1 | * | 1/2005 | Lee et al. | 348/207.99 |
| 2005/0059339 | A1 | * | 3/2005 | Honda et al. | 455/3.01 |

FOREIGN PATENT DOCUMENTS

EP 1473634 11/2004

* cited by examiner

*Primary Examiner*—Steven S Paik
*Assistant Examiner*—Christie I Marshall
(74) *Attorney, Agent, or Firm*—Roylance, Abrams, Berdo & Goodman, L.L.P.

(57) ABSTRACT

A method and a mobile terminal where reproduction of a security barcode in a mobile terminal including a special function is prevented. When a security function is executed, a security barcode corresponding to security barcode generation information is generated and the special function is controlled. When the security function is released, the generated security barcode is removed and the control of the special function is released. When the special function is executed, execution information of the special function is stored. When the security function is executed again, the execution information of the special function is added to the security barcode generation information so as to generate new security barcode generation information. A security barcode corresponding to the new security barcode generation information is generated, and the generated security barcode is displayed.

19 Claims, 5 Drawing Sheets

METHOD FOR PREVENTING SECURITY BARCODE FROM BEING REPRODUCED IN MOBILE TERMINAL AND MOBILE TERMINAL IMPLEMENTING THE SAME

CROSS-REFERENCE TO RELATED APPLICATIONS

This application claims the benefit under 35 U.S.C. § 119 (a) of a Korean Patent Application Serial No. 2005-58042 filed in the Korean Intellectual Property Office on Jun. 30, 2005, the entire contents of which are hereby incorporated by reference.

BACKGROUND OF THE INVENTION

1. Field of the Invention

The present invention relates to a method for generating a security barcode in a mobile terminal. More particularly, the present invention relates to a method for preventing a security-related security barcode from being reproduced, and a mobile terminal implementing the same.

2. Description of the Related Art

Recently, the mobile communication field has been rapidly developed, so that a mobile terminal can perform various functions. Such a mobile terminal basically performs a Personal Information Management (PIM) function, and has become a necessity of life through hybridization of a digital camera, a mobile banking, a satellite DMB, an MP3, a remote control, and so forth. However, such a phenomenon causes problems for information security.

With the advent of the information age and the increased need for information security, security in an enterprise is being increasingly recognized as an important issue for the enterprise. A multifunctional mobile terminal equipped with a camera may be freely carried by a user within the premises or a security area of a general enterprise. Recently, using a mobile terminal as a hidden camera has giving rise to public social criticism. In addition, information may be leaked through the camera in the security area as described above. Moreover, information may be leaked through a mobile storage medium detachable from a mobile terminal.

Accordingly, secret government facilities or enterprises, which require information security, install various security systems, thereby preventing secret materials from being leaked. Among the security systems, there is a security system for assigning an authentication indicator such as a security barcode to a mobile terminal of a visitor, thereby controlling entrance of the visitor and simultaneously controlling special functions such as a camera function, an MP3 function and a mobile storage medium function. However, because the security barcode used for the security system continuously maintains its original form for each visitor who enters secret government facilities or enterprises and leaves there, the security barcode may be easily scanned and reproduced and data of the security barcode may be easily leaked. For example, if data of the security barcode originally generated are continuously maintained without change, it is impossible to know when the security barcode was originally generated. Accordingly, a person desiring to reproduce the security barcode may have enough time to reproduce the security barcode. Further, when the data of the security barcode has been leaked, a third party may enter a location requiring the security barcode at any time by means of the leaked security barcode.

In the security barcode applied to the security system, because the data of the security barcode originally generated are stored in a mobile terminal, it is possible to release a security function and temporarily remove the security barcode. Consequently, it is possible to easily reproduce another security barcode identical to the security barcode by means of a special function. For example, if a person desiring to release the security function obtains a hacking or security release password, releases the security function, and then executes the security function again by means of a special function, it is possible for the person to reproduce the same security barcode by means of stored barcode data. Therefore, it is impossible to know when the security function has been release while the person stays in a specific area.

SUMMARY OF THE INVENTION

Accordingly, the present invention has been made to address at least the above-mentioned problems occurring in the prior art, and it is an object of the present invention to provide a method and a mobile terminal whereby, in a mobile terminal including both a security barcode generated through an execution of a security function and a controlled special function, another security barcode identical to the security barcode is prevented from being reproduced and generated when the security function is released and then executed again.

It is another object of the present invention to provide a method for continuously updating a security barcode in a mobile terminal executing a security function, thereby preventing the security barcode from being easily reproduced.

In accordance with exemplary aspects of the present invention, there are provided a method, and a mobile terminal implementing the same, for preventing a security barcode from being reproduced in a mobile terminal including a special function. When a security function is executed, a security barcode corresponding to security barcode generation information is generated and the special function is controlled. When the security function is released, the generated security barcode is removed and the control of the special function is released. When the special function is executed, execution information of the special function is stored, and when the security function is executed again, the execution information of the special function is added to the security barcode generation information, so as to generate new security barcode generation information. A security barcode corresponding to the new security barcode generation information is generated, and the generated security barcode is displayed.

In accordance with other exemplary aspects of the present invention, there are provided a method, and a mobile terminal implementing the same, for preventing a security barcode from being reproduced in a mobile terminal including a special function. When a security function is executed, a security barcode corresponding to security barcode generation information is generated, and the special function is controlled. When predetermined signals are generated, time information regarding the generation of the predetermined signals is stored, and the time information is added to the security barcode generation information. A security barcode corresponding to the security barcode generation information to which the time information has been added is generated and displayed.

BRIEF DESCRIPTION OF THE DRAWINGS

The above and other objects, features and advantages of the present invention will be more apparent from the following detailed description taken in conjunction with the accompanying drawings, in which like reference numerals will be understood to refer to like parts, components and structures, where.

DETAILED DESCRIPTION OF EXEMPLARY EMBODIMENT

Certain exemplary embodiments of the present invention will be described in detail herein below with reference to the accompanying drawings. In the following description, a detailed description of known functions and configurations incorporated herein will be omitted for clarity and conciseness.

Figure 1:
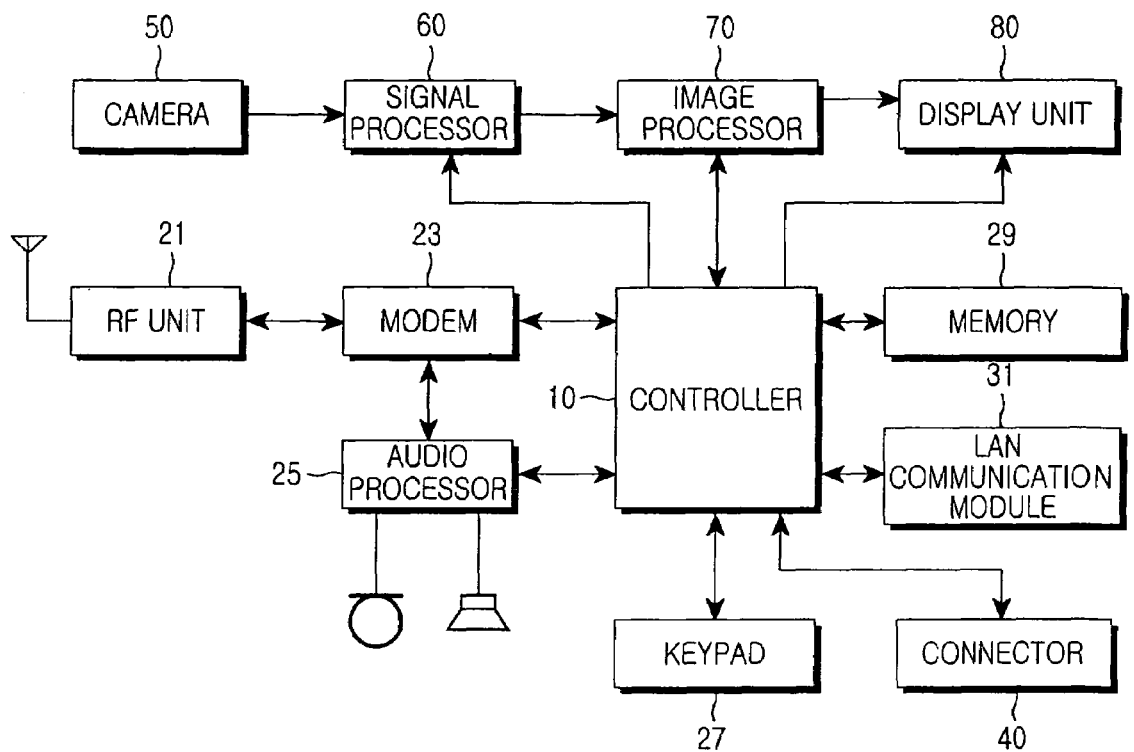
FIG. 1 is a block diagram illustrating a construction of a mobile terminal according to an exemplary embodiment of the present invention.

FIG. 1 is a block diagram illustrating a construction of a mobile terminal according to an exemplary embodiment of the present invention. The mobile terminal may be a mobile phone.

Referring to FIG. 1, a Radio Frequency (RF) unit 21 performs communication of a mobile terminal. The RF unit 21 includes an RF transmitter for up-converting and amplifying the frequency of transmitted signals, an RF receiver for low-noise amplifying received signals and down-converting the frequency of the received signals, and so on.

A modem 23 includes a transmitter for coding and modulating the transmitted signals, a receiver for demodulating and decoding the received signals, and so on.

An audio processor 25 may include a codec. The codec includes a data codec for processing, for example, packet data, and an audio codec for processing audio signals such as voice. The audio processor 25 converts digital audio signals received through the modem 23 into analog signals through the audio codec for reproduction, or converts analog audio signals generated from a microphone into digital audio signals through the audio codec and transmits the digital audio signals to the modem 23. The codec may be separately provided or included in a controller 10.

A keypad 27 includes keys for inputting numerals and character information and function keys for executing various functions.

A memory 29 may include a program memory and a data memory. The program memory may store programs for controlling general operations of the mobile terminal, programs necessary for generating a security barcode, and a program necessary for controlling a special function in generating the security barcode according to one embodiment of the present invention. The data memory temporarily stores data generated during the execution of the programs. Further, the data memory stores security barcode generation information, and stores special function use information when the special function is used, according to one embodiment of the present invention.

The controller 10 performs a function of controlling the general operations of the mobile terminal, which may also include the modem 23 and the codec. According to one embodiment of the present invention, when a security function is executed, if the security barcode generation information is received, the controller 10 stores the received security barcode generation information, controls a security barcode corresponding to the security barcode generation information to be generated, and controls a special function. When the security function is released, the controller 10 removes the generated security barcode and releases the control of the special function. When the special function is executed, the controller 10 stores execution information of the special function. When the security function is executed again, the controller 10 adds the execution information of the special function to the security barcode generation information, and controls a security barcode corresponding to the added security barcode generation information to be generated. Further, when predetermined signals are generated, the controller 10 stores time information regarding the generation of the predetermined signals, adds the time information to the security barcode generation information, controls a security barcode corresponding to the added security barcode generation information to be generated.

A camera 50 includes a camera sensor for photographing image data and converting photographed optical signals into electric signals. In an exemplary implementation, the camera sensor may be a Charge-Coupled Device (CCD) sensor.

A signal processor 60 converts video signals output from the camera 50 into image signals. The signal processor 60 may be realized by, for example, a Digital Signal Processor (DSP).

An image processor 70 generates screen data for displaying the image signals output from the signal processor 60. The image processor 70 transmits received image signals according to the standard of a display unit 80 under the control of the controller 10, and compresses and decompresses the image data. Further, the image processor 70 transmits a start address value of the image data output to the display unit 80, or changes and transmits the start address value under the control of the controller 10.

The display unit 80 displays the image data output from the image processor 70. The display unit 80 may use a Liquid Crystal Display (LCD). In this case, the display unit 80 may include an LCD controller, a memory capable of storing the image data, an LCD display device, etc. When the LCD has a touch screen function, the keypad 27 and the LCD may function as an input unit. The display unit 80 includes an image data display unit to which the image data are output.

A Local Area Network (LAN) communication module 31 may include a Bluetooth, infrared data communication (Irda), and an Ultra Wide Band (UWB). Preferably, the LAN communication module 31 may be a Bluetooth. A Bluetooth may transmit data by means of high frequency of 2.4 GHz regardless of an obstacle, and may use maximum 79 channels in data transmission. A Bluetooth has consumption power of 0.3 mA in a waiting state and about 30 mA in a data exchange state.

A connector 40 may be constructed in various types according to shapes and connection methods. For example, a socket connector is combined with a plug connector, so that it is possible to transfer signals. It is common that the connector 40 includes a contact (terminal), an insulator for protecting the terminal and preventing short-circuiting with an adjacent terminal, and a shell. The connector 40 is connected to an apparatus such as a security PC or a security entrance authenticator through a cable, and receives the barcode generation information according to one embodiment of the present invention.

Hereinafter, the operation of the mobile terminal will be described with reference to FIG. 1. If a user performs a dialing operation through the keypad 27 and establishes an originating mode on an originating call, the controller 10 detects the originating mode, processes dial information received through the modem 23, converts the dial information into RF signals through the RF unit 21, and outputs the RF signals. Then, if a partner-subscriber generates response signals, the controller 10 detects the response signals through the RF unit 21 and the modem 23. Then, a voice speech path is formed through the audio processor 25, so that the user communicates with the partner-subscriber. In a termination mode, the controller 10 detects the termination mode through the modem 23 and generates ring signals through the audio processor 25. If the user responds, the controller 10 detects the response. Likewise, a voice speech path is formed through the audio processor 25, so that the user communicates with the partner-subscriber. In the originating mode and the termination mode, voice communication is described as an example. However, the controller 10 may also perform a data communication function for transmitting packet and image data in addition to the voice communication. When the mobile terminal is in a waiting mode or performs character communication, the controller 10 displays character data processed through the modem 23 on the display unit 80.

Hereinafter, an operation for preventing a barcode from being reproduced in the mobile terminal as described above according to one embodiment of the present invention will be described. In an execution of the security function, the controller 10 executes the security function by controlling the memory 29. If security barcode generation information is transmitted through the LAN communication module 31 or the connector 40, the controller 10 controls the memory 29 to store the security barcode generation information, generates a security barcode corresponding to the security barcode generation information, and controls a special function. If the security function is released, the controller 10 controls the memory 29 to remove the generated security barcode, and releases the control of the special function. When the special function is executed, the controller 10 controls the memory 29 to store execution information of the special function. Then, when the security function is executed again, the controller 10 adds the execution information of the special function to the security barcode generation information, controls the memory 29 to store the added security barcode generation information, and generates a security barcode corresponding to the added security barcode generation information.

Figure 2:
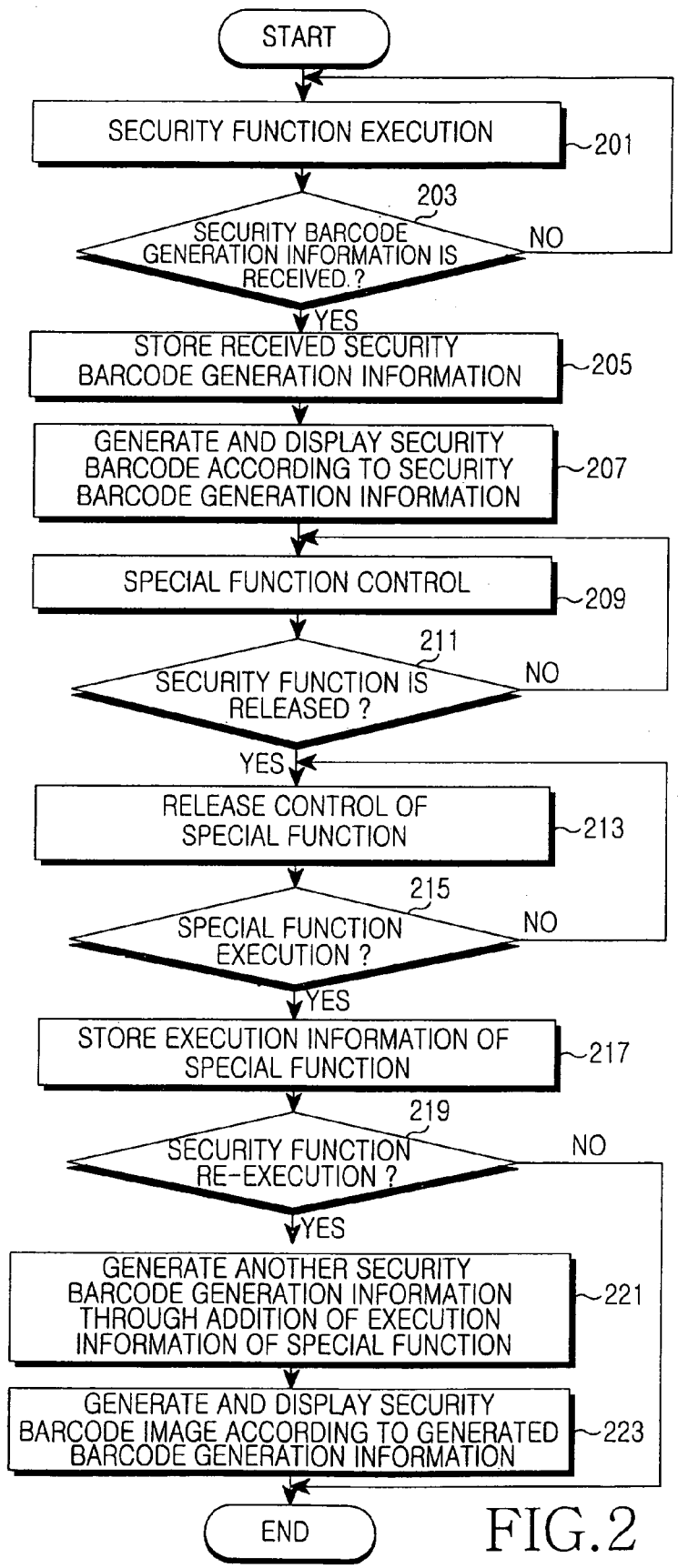
FIG. 2 is a flow diagram illustrating an operation for preventing a security barcode from being reproduced in a mobile terminal according to a first exemplary embodiment of the present invention.

FIG. 2 is a flow diagram illustrating an operation for preventing a security barcode from being reproduced in a mobile terminal according to a first exemplary embodiment of the present invention, and FIG. 4 is a diagram illustrating a security barcode applied to the first exemplary embodiment of the present invention. Hereinafter, an operation will be described with reference to FIGS. 2 and 4, in which, in a mobile terminal including both a security barcode generated through an execution of a security function and a controlled special function, another security barcode different from the security barcode is generated when the security function is released and then executed again. If a user presses a security function key by means of the keypad 27 in a waiting state, the controller 10 detects that the security function key is pressed, and controls the memory 29 so as to execute the security function in step 201. Herein, the user connects the connector 40 to a security PC through a cable, or operates the LAN communication module 31 so as to form a piconet with the security PC. If security barcode generation information is received from the security PC through the LAN communication module 31 or the connector 40, the controller 10 detects the reception of the security barcode generation information in step 203, and controls the memory 29 to store the received security barcode generation information in step 205. The security barcode generation information represents information (code information) generated after the security PC combines user (visitor, employee) information and information of the mobile terminal, such as name information, resident registration (employee number) information, address information, company information, department information, security violation information, and term of validity of the user (visitor, employee) with model name information, number information, encrypted Electronic Serial Number (ESN) information, and time information of the mobile terminal. Further, the mobile terminal itself may combine the user information with the mobile terminal information, thereby generating the security barcode generation information.

Figure 4A:
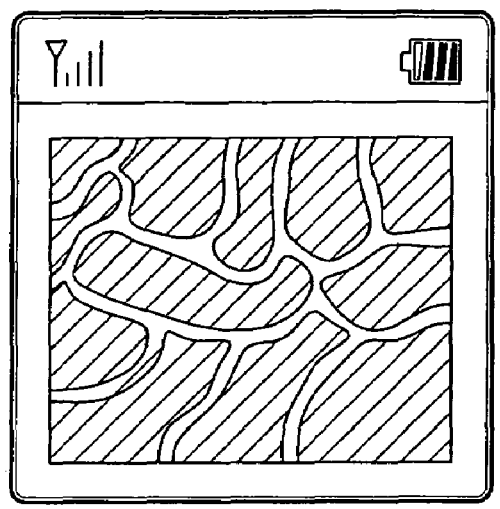
FIG. 4 is a diagram illustrating a security barcode applied to a first exemplary embodiment of the present invention.

In step 207, the controller 10 controls the memory 29 and the display unit 80 so as to generate a security barcode by means of the received security barcode generation information, and displays the generated security barcode as illustrated in FIG. 4a.

The security barcode may include a stack type of two-dimensional barcode and a matrix type of two-dimensional barcode. The stack type of two-dimensional barcode includes a plurality of barcodes maintaining binary code data, and the barcodes are stacked on multi-layers (lows) in a direction perpendicular to an arrangement direction of bars of each barcode. The lows are distinguished by start codes and stop codes provided to each low. In the matrix type of two-dimensional barcode, binary code data are converted into cells arranged in two directions (vertical and horizontal directions). The matrix barcode has areas displayed with black and white cell patterns (generally, quadrangles). The stack type of two-dimensional barcode includes a CODE49, a CODE16K, a PDF417, etc., and the matrix type of two-dimensional barcode includes a DATA CODE, a QR CODE, a MAXI CODE, a Veri CODE, a CODEI, an Array Tag, a CP CODE, a Carla CODE, etc.

If the security barcode is generated as described above, the controller 10 controls the special function provided to the mobile terminal not to be used in step 209. The special function may include a data storage function such as a camera function, an MP3 function and a mobile storage medium function, or a data transmission function such as a LAN communication.

If signals for releasing the executed security function are generated, the controller 10 detects the generation of the signals in step 211, and releases the control setting of the special function in step 213. If the special function is executed, the controller 10 detects the execution of the special function in step 215, and controls the memory 29 to store execution information of the executed special function, such as type information of the executed special function and information (executed time information) regarding time at which the special function has been executed, in step 217. For example, if the security function has been released and the camera function has been executed at 11:30 AM on June 5, the memory 29 stores both type information of a function corresponding to the camera function and time information regarding "11:30 AM on June 5" at which the camera function was executed.

If the security function is executed again, the controller 10 detects the execution of the security function in step 219, and controls the memory 29 so as to add the execution information of the special function to the stored security barcode generation information for combination, and to generate another security barcode generation information in step 221. That is, the controller 10 generates said another security barcode generation information different from the stored security barcode generation information by combining the name information, resident registration (employee number) information, address information, company information, department information, security violation information, and term of validity of the user (visitor, employee) with the model name information, number information, encrypted Electronic Serial Number (ESN) information, time information, type information of the special function, and executed time information of the mobile terminal.

Figure 4B:
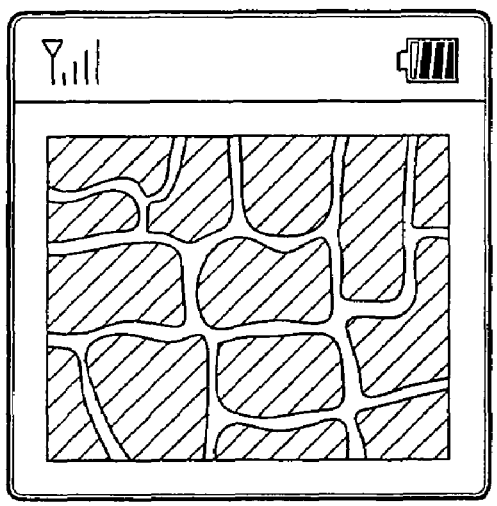

In step 223, the controller 10 controls the memory 29 and the display unit 80 so as to generate a security barcode according to the generated security barcode generation information, and displays the generated security barcode as illustrated in FIG. 4b. Accordingly, the security barcode (FIG. 4b) generated after the security function is released and then executed again is displayed differently from the security barcode (FIG. 4a) generated before the security function is released.

Figure 3:
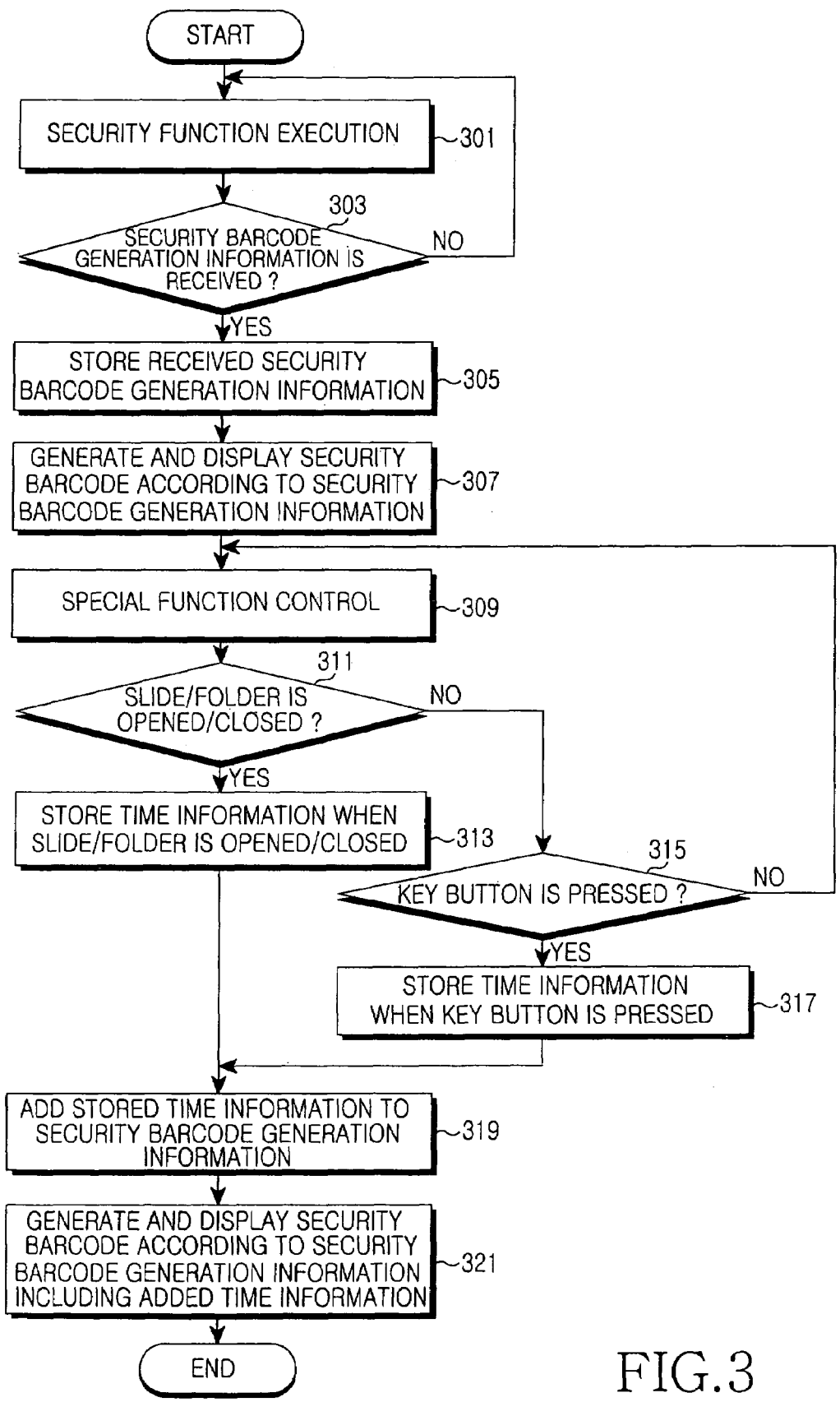
FIG. 3 is a flow diagram illustrating an operation for preventing a security barcode from being reproduced in a mobile terminal according to a second exemplary embodiment of the present invention.

FIG. 3 is a flow diagram illustrating an operation for preventing a security barcode from being reproduced in a mobile terminal according to a second embodiment of the present invention, and FIG. 5 is a diagram illustrating a security barcode applied to the second embodiment of the present invention. Hereinafter, an operation for continuously updating (generating) a security barcode in a mobile terminal executing a security function will be described with reference to FIGS. 3 and 5. If a user presses a security function key by means of the keypad 27 in a waiting state, the controller 10 detects that the security function key is pressed, and controls the memory 29 so as to execute the security function in step 301. Herein, the user connects the connector 40 to a security PC through a cable, or operates the LAN communication module 31 so as to form a piconet with the security PC. If security barcode generation information is received from the security PC through the LAN communication module 31 or the connector 40, the controller 10 detects the reception of the security barcode generation information in step 303, and controls the memory 29 to store the received security barcode generation information in step 305. The security barcode generation information represents information (code information) generated after the security PC combines user (visitor, employee) information and information of the mobile terminal, i.e. name information, resident registration (employee number) information, address information, company information, department information, security violation information, and term of validity of the user (visitor, employee) with model name information, number information, encrypted Electronic Serial Number (ESN) information, and time information of the mobile terminal. Further, the mobile terminal itself may combine the user information with the mobile terminal information, thereby generating the security barcode generation information.

Figure 5A:
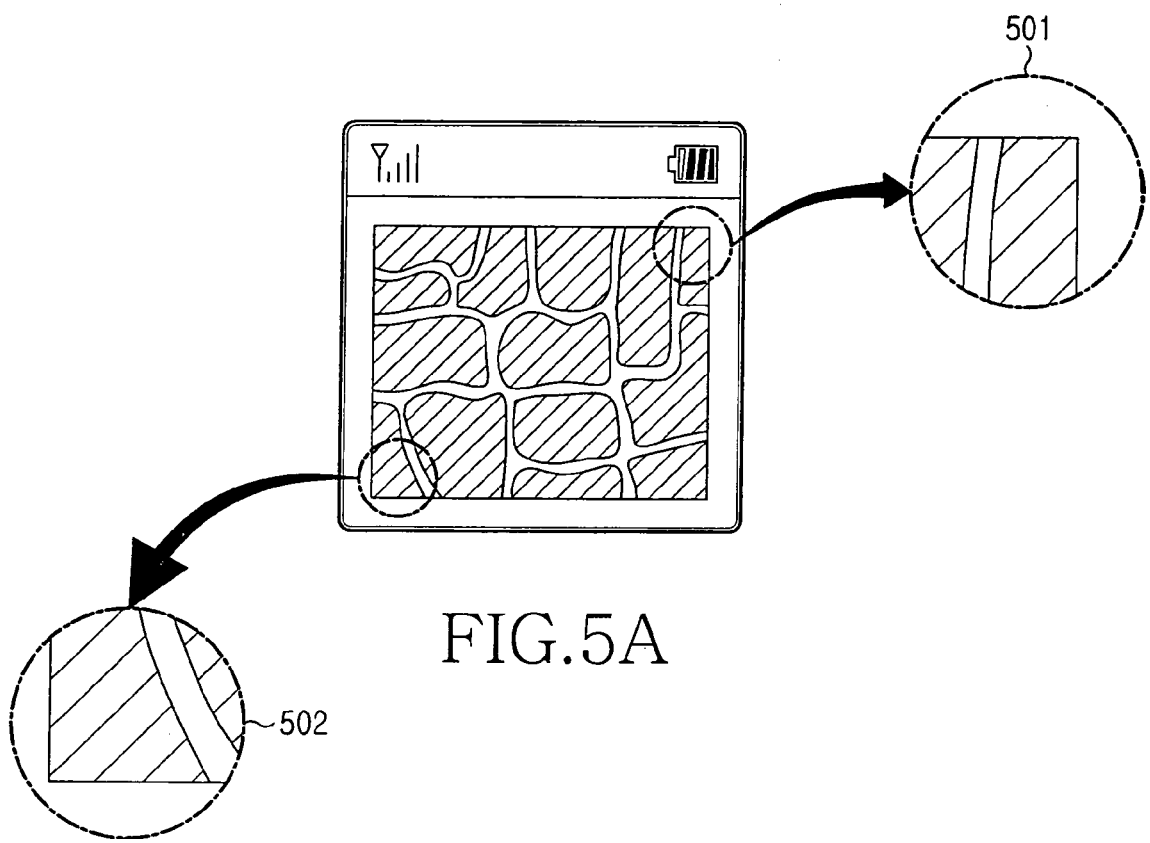
FIG. 5 is a diagram illustrating a security barcode applied to a second exemplary embodiment of the present invention.

In step 307, the controller 10 controls the memory 29 and the display unit 80 so as to generate a security barcode by means of the received security barcode generation information, and displays the generated security barcode as illustrated in FIG. 5a. Then, the controller 10 controls the special function provided to the mobile terminal not to be used in step 309. The special function may include a data storage function and/or a data transmission function such as a camera function, an MP3 function and a mobile storage medium function. Reference numbers 501 and 502 in FIG. 5a indicate enlarged views for specific parts of the security barcode, respectively.

If a slide or a folder of the mobile terminal is opened or closed, the controller 10 detects that the slide or the folder is opened or closed in step 311, and controls the memory 29 to store time information when the slide or the folder is opened or closed in step 313. If a key button is pressed, the controller 10 detects that the key button is pressed in step 315, and controls the memory 29 to store time information when the key button is pressed in step 317. In step 319, the controller 10 controls the memory 29 so as to add the time information to the stored security barcode generation information.

Figure 5B:
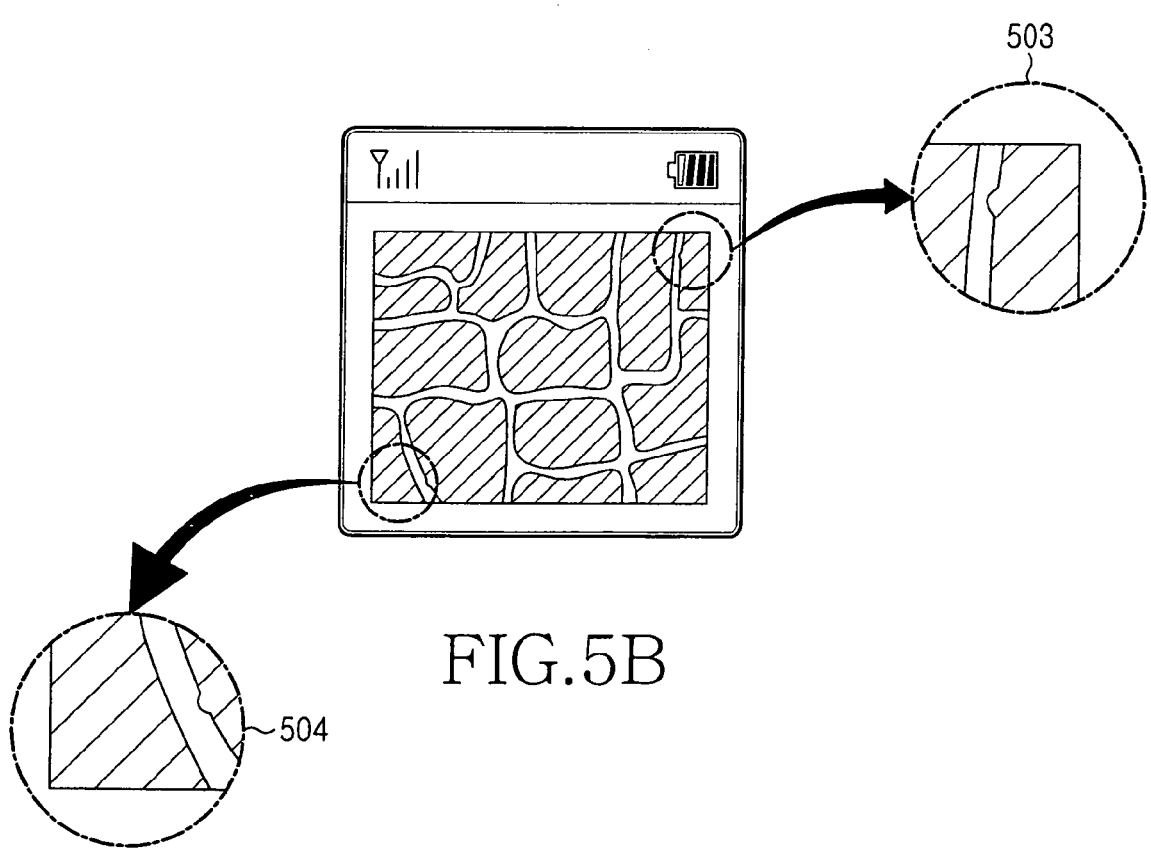

In step 321, the controller 10 controls the memory 29 and the display unit 80 so as to update (generate) the security barcode by means of the security barcode generation information to which the time information has been added, and displays the security barcode as illustrated in FIG. 5b. Reference numbers 503 and 504 in FIG. 5b indicate enlarged views for specific parts of the security barcode, respectively.

When the security barcodes are read, both the security barcode (FIG. 5b) generated by means of the security barcode generation information, to which the time information has been added, and the security barcode (FIG. 5a) generated through the execution of the security function are determined as the same security barcodes, and only the added time information can be extracted.

As described above, exemplary embodiments of the present invention provide both a method and a mobile terminal, by which, in a mobile terminal including a security barcode generated through an execution of a security function, another security barcode different from the security barcode is generated when the security function is released and executed again, and a method for continuously updating (generating) the security barcode. Consequently, exemplary implementations of the present invention may prevent the security barcode from being reproduced and improve the efficiency of a security-related system.

Although certain exemplary embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for preventing a security barcode from being reproduced in a mobile terminal including a special function, the method comprising the steps of:
   when a first security function is executed, generating a first security barcode corresponding to first security barcode generation information and controlling the special function;
   when the first security function is released, removing the first security barcode and releasing the control of the special function;
   when the special function is executed, storing execution information of the special function; and
   when a second security function is executed, adding the execution information of the special function to the first security barcode generation information to generate a second security barcode generation information, generating a second security barcode corresponding to the second security barcode generation information, and displaying the second security barcode.

2. The method as claimed in claim 1, further comprising a step of receiving the security barcode generation information through at least one of local area network communication and a connector.

3. The method as claimed in claim 1, further comprising a step of storing at least one of the first and second security barcode generation information.

4. The method as claimed in claim 1, wherein at least one of the first and second security barcode generation information comprises at least one of personal information of a user and encrypted Electronic Serial Number (ESN) information.

5. The method as claimed in claim 1, wherein the special function comprises at least one of a camera function, an MP3 function, a mobile storage medium function, and a data transmission function.

6. The method as claimed in claim 1, wherein the execution information of the special function comprises at least one of type information of the executed special function and time information regarding the execution of the special function.

7. A method for preventing a security barcode from being reproduced in a mobile terminal including a special function, the method comprising the steps of:
   when a security function is executed, generating a first security barcode corresponding to security barcode generation information and controlling the special function;
   when signals are generated, storing time information regarding the generation of the signals; and
   adding the time information to the security barcode generation information, and generating and displaying a second security barcode corresponding to the security barcode generation information comprising the time information added thereto.

8. The method as claimed in claim 7, further comprising a step of receiving the security barcode generation information through at least one of a connector and local area network communication.

9. The method as claimed in claim 7, wherein the security barcode generation information comprised at least one of personal information of a user and encrypted Electronic Serial Number (ESN) information.

10. The method as claimed in claim 7, wherein the special function comprised at least one of a camera function, an MP3 function, a mobile storage medium function, and a data transmission function.

11. The method as claimed in claim 7, wherein the signals are generated when a folder of the mobile terminal is opened or closed, or when a keypad is operated.

12. The method as claimed in claim 7, wherein, when at least one of the first and second security barcodes are read, both the first and second security barcodes are determined as the same security barcodes, when time information is subtracted from the second security barcode.

13. A mobile terminal configured to perform a special function, the mobile terminal comprising:
   an interface for commanding execution of a special function;
   a display unit;
   memory comprising at least one of a program memory for storing programs for generating a security barcode, and for controlling the special function, and a data memory for storing a security barcode generation information; and a controller;
   when a first security function is executed, the controller controls generation of a first security barcode corresponding to a first security barcode generation information and controls the special function;
   when the first security function is released, the controller removes the first security barcode and releasing the control of the special function;
   when the special function is executed, execution information of the special function is stored in the data memory; and
   when a second security function is executed, the execution information of the special function is added to the first security barcode generation information to generate a second security barcode generation information, a second security barcode corresponding to the second security barcode generation information is generated, and the second security barcode is displayed on the display unit.

14. The mobile terminal as claimed in claim 13, wherein the interface comprises a keypad.

15. The mobile terminal as claimed in claim 13, further comprising at least one of a connector and local area network communication configured to receive the security barcode generation information.

16. The mobile terminal as claimed in claim 13, wherein the data memory is configured to store at least one of the first and second security barcode generation information.

17. The mobile terminal as claimed in claim 13, wherein at least one of the first and second security barcode generation information comprises at least one of personal information of a user and encrypted Electronic Serial Number (ESN) information.

18. The mobile terminal as claimed in claim 13, wherein the special function comprises at least one of a camera function, an MP3 function, a mobile storage medium function, and a data transmission function.

19. The mobile terminal as claimed in claim 13, wherein the execution information of the special function comprises at least one of type information of the executed special function and time information regarding the execution of the special function.

* * * * *